(12) United States Patent
Morikawa

(10) Patent No.: US 9,286,070 B2
(45) Date of Patent: Mar. 15, 2016

(54) CONTROL APPARATUS

(71) Applicant: CANON KABUSHIKI KAISHA, Tokyo (JP)

(72) Inventor: Daisuke Morikawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 13/940,094

(22) Filed: Jul. 11, 2013

(65) Prior Publication Data

US 2014/0025936 A1 Jan. 23, 2014

(30) Foreign Application Priority Data

Jul. 20, 2012 (JP) .................................. 2012-161268

(51) Int. Cl.
| | | |
|---|---|---|
| G06F 9/00 | (2006.01) | |
| G05B 19/00 | (2006.01) | |
| H04L 1/00 | (2006.01) | |
| G06F 9/30 | (2006.01) | |
| G05B 19/042 | (2006.01) | |
| H04L 1/08 | (2006.01) | |

(52) U.S. Cl.
CPC ........ G06F 9/30145 (2013.01); G05B 19/0428 (2013.01); *G05B 2219/23282* (2013.01); *H04L 1/08* (2013.01)

(58) Field of Classification Search
CPC . G06F 9/223; G06F 9/30145; G06F 11/0721; G06F 11/0733; G06F 11/0745; G06F 11/0751; G06F 11/0793; G06F 11/079; G06F 11/08; G06F 11/10; G05B 19/0423; G05B 19/0428; G05B 2219/23282; G05B 23/02; H04L 1/1809; H04L 1/1816; H04L 1/189; H04L 1/08; H04L 1/1858; H04L 1/1829

USPC .......................................................... 714/49
See application file for complete search history.

(56) References Cited

U.S. PATENT DOCUMENTS 5,384,565 A * 1/1995 Cannon ................. H04L 1/1829
340/7.22
2010/0328801 A1* 12/2010 Yorimitsu .......... G11B 20/1833
360/31

FOREIGN PATENT DOCUMENTS

| JP | 2000-041057 A | | 2/2000 |
|---|---|---|---|
| JP | 2006-191188 A | | 7/2006 |
| JP | 2006191188 A | * | 7/2006 |
| JP | 2007-148592 A | | 6/2007 |
| JP | 2007148592 A | * | 6/2007 |
| JP | 2007-317263 A | | 12/2007 |

* cited by examiner

*Primary Examiner* — Bryce Bonzo
*Assistant Examiner* — Anthony J Amoroso
(74) *Attorney, Agent, or Firm* — Canon USA, Inc. IP Division

(57) ABSTRACT

A control apparatus configured to receive instruction data from a transmission unit and to control a controlled apparatus based on the instruction data includes a determination unit configured to determine an error in reception of the instruction data from the transmission unit, a communication unit configured to receive the instruction data from the transmission unit and to transmit reply data according to a result of determination of the determination unit to the transmission unit, a module configured to control the controlled apparatus based on the instruction data, and a control unit configured to, if a content of current instruction data received by the communication unit matches a content of previous instruction data received by the communication unit, control the module not to control the controlled apparatus based on the current instruction data.

10 Claims, 12 Drawing Sheets

CONTROL APPARATUS

BACKGROUND OF THE INVENTION

1. Field of the Invention

The present invention relates to a control apparatus that receives instruction data from a transmission unit and controls a controlled apparatus based on the instruction data.

2. Description of the Related Art

Image forming apparatuses such as a copying machine and a multifunction peripheral perform serial communications between their built-in central processing units (CPUs) and dedicated semiconductor devices for performing drive control of various motors. Hereinafter, dedicated semiconductor devices will be referred to as application specific integrated circuits (ASICs). Serial communications transfer addresses and data through the same communication line in a time-division manner. Serial communications can thus reduce the wiring area as compared to parallel communications which use a plurality of communication lines. Serial communications, however, need an increased communication frequency to achieve a transfer rate equivalent to or higher than that of parallel communications.

If the communication frequency is increased to increase communication speed, communication errors occur more easily due to noise getting into the communication line(s). Various techniques have heretofore been discussed to avoid such communication errors. Examples include the inventions discussed in Japanese Patent Application Laid-Open No. 2000-41057, Japanese Patent Application Laid-Open No. 2007-148592, Japanese Patent Application Laid-Open No. 2006-191188, and Japanese Patent Application Laid-Open No. 2007-317263.

Japanese Patent Application Laid-Open No. 2000-41057 discusses a serial communication system that transfers the same communication data twice in one communication. The first communication data and the second communication data are compared, and if the comparison result indicates a mismatch, a communication error is determined to have occurred. An internal access of the data occurs only if the comparison result indicates a match. Since one serial communication transfers the same data twice, the effective value of the communication rate is reduced by half.

Japanese Patent Application Laid-Open No. 2007-148592 discusses a data communication apparatus that performs a communication between a CPU and a device by using an inter-integrated circuit (I2C) bus. Transfer data transferred from the CPU to the device includes a clock signal and a data signal, which are fed back to the CPU. The CPU monitors any difference between the transfer data and the feedback data and thereby determines the occurrence of a communication error. When a communication error occurs, the CPU retransmits the transfer data.

Japanese Patent Application Laid-Open No. 2006-191188 discusses an image transfer apparatus that transfers pixel data by serial communication. The pixel data is serial data to which error detection data is added line by line. The image transfer apparatus detects the presence or absence of an error in the pixel data by using the error detection data. The image transfer apparatus temporarily stores the pixel data line by line regardless of the present or absence of an error, and if the pixel data is determined to be erroneous, the image transfer apparatus will not write the pixel data into a frame memory.

Japanese Patent Application Laid-Open No. 2007-317263 discusses a method for recovering data by adjusting a data transfer clock and making a retry if a transfer error of serial data occurs.

Image forming apparatuses require stable, high productivity. An image forming apparatus may include driving parts such as a motor, and sensors for monitoring various parts. To control such driving parts and sensors by serial communication, a communication baud rate as high as several M bps is needed when calculated from the number of register accesses needed per unit time. The necessary communication baud rate is even higher if possibilities of retransmissions (retries) in the event of an error are taken into account. In a method for performing communication by using communication packets including cyclic redundancy check (CRC), it is relatively easy to monitor communication errors. With such communication packets, the processing for retransmitting data in the event of an error due to line noise can be performed in a short time. This can maintain high productivity required of an image forming apparatus.

The foregoing Japanese Patent Application Laid-Open No. 2000-41057, Japanese Patent Application Laid-Open No. 2007-148592, Japanese Patent Application Laid-Open No. 2006-191188, and 2007-317263 each discuss a method for avoiding a communication error that occurs when transferring data from a side for transmitting control data needed for control (hereinafter, referred to as a "main station") to a side for receiving the control data (hereinafter, referred to as a "slave station"). If a communication from the main station to the slave station has succeeded but noise gets into reply data from the slave station to the main station, the main station determines that the slave station is undergoing a communication error, and retransmits the data.

In such a case, the slave station recognizes that the communication has normally been made once. An internal access occurred at that point. When the main station retransmits the data, the same access is repeated. The repetition matters little if such an access is made to a simple register where two consecutive write or read operations will not cause a state transition of a control target. On the other hand, if the access is a start trigger of an operation, two consecutive accesses can restart the operation that has once been started. An intended operation can also fail in the case of first-in, first-out (FIFO) where an access entails a state transition.

SUMMARY OF THE INVENTION

According to an aspect of the present invention, a control apparatus configured to receive instruction data from a transmission unit and to control a controlled apparatus based on the instruction data includes a determination unit configured to determine an error in reception of the instruction data from the transmission unit, a communication unit configured to receive the instruction data from the transmission unit and to transmit reply data according to a result of determination of the determination unit to the transmission unit, a module configured to control the controlled apparatus based on the instruction data, and a control unit configured to, if a content of current instruction data received by the communication unit matches a content of previous instruction data received by the communication unit, control the module not to control the controlled apparatus based on the current instruction data.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
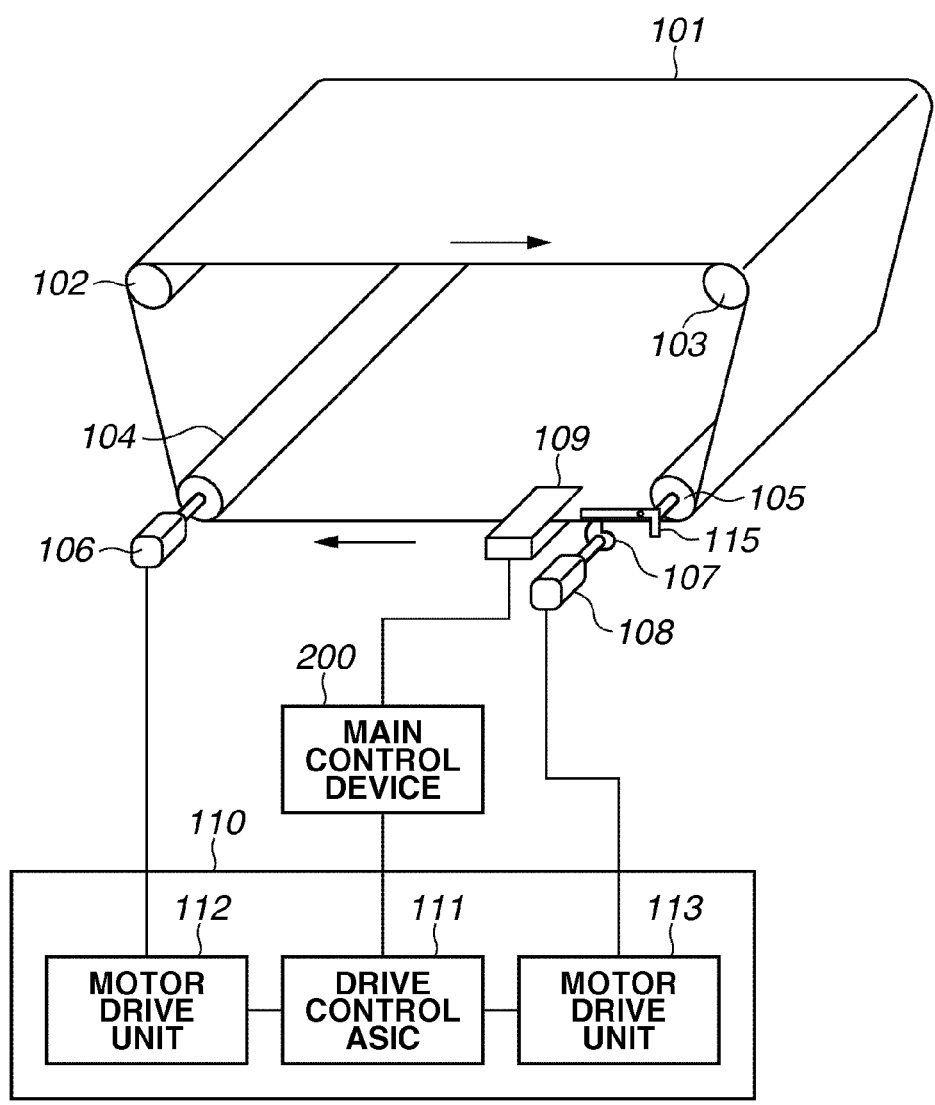
FIG. 1 is a block diagram illustrating a drive control mechanism of an intermediate transfer belt.

FIG. 1 is a block diagram illustrating a drive control mechanism of an ITB, which is built in an image forming apparatus using a serial communication system according to an exemplary embodiment of the present invention.

The ITB 101 is rotated by rotations of an ITB driving roller 104, an ITB steering roller 105, and driven rollers 102 and 103 which are driven by the ITB driving roller 104 and the ITB steering roller 105. The ITB 101 is steered by such rollers. An ITB driving motor 106 drives the ITB driving roller 104 to rotate. The ITB steering roller 105 controls a deviation of the ITB 101 with the aid of an ITB steering eccentric cam 107 and an ITB steering lever 115. An ITB steering motor 108 drives the ITB steering eccentric cam 107. A belt position detection sensor 109 detects a belt position of the ITB 101 as an analog value.

An ITB drive control apparatus 110 controls rotation operations of the ITB driving motor 106 and the ITB steering motor 108. The ITB drive control apparatus 110 includes a drive control ASIC 111 and motor drive units 112 and 113. The drive control ASIC 111 is a dedicated semiconductor device for drive control. In FIG. 1, the ITB drive control apparatus 110 is illustrated to include only the drive control ASIC 111 and the motor drive units 112 and 113, whereas not-illustrated various motor control circuits and/or sensor drive circuits may also be included. The drive control ASIC 111 transmits pulse width modulation (PWM) signals to the motor drive units 112 and 113 to control the ITB driving motor 106 and the ITB steering motor 108. The ITB drive control apparatus 110 operates according to an instruction from a main control apparatus 200. The main control apparatus 200 controls an overall operation of the image forming apparatus. The main control apparatus 200 converts the analog value indicating the belt position detected by the belt position detection sensor 109 into digital data and processes the digital data. The main control apparatus 200 measures a position of the ITB 101 based on the result of detection of the belt position detection sensor 109. The main control apparatus 200 controls the ITB drive control apparatus 110 according to the measurement result.

Figure 2:
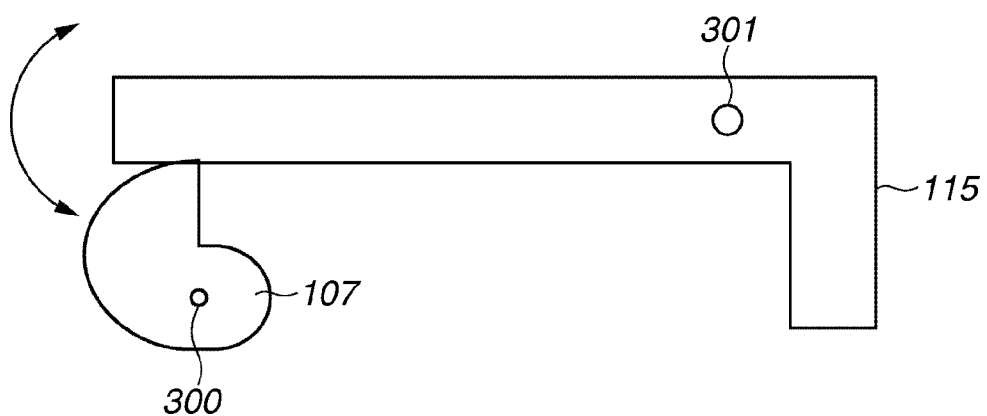
FIG. 2 is a diagram illustrating a configuration of an intermediate transfer belt (ITB) steering eccentric cam.

FIG. 2 is a diagram illustrating a configuration of the ITB steering eccentric cam 107 for steering the ITB 101. The ITB steering eccentric cam 107 is partly in contact with the ITB steering lever 115. The ITB steering motor 108 rotates the ITB steering eccentric calm 107 around a rotation center 300. The distance from the rotation center 300 to the position where the ITB steering eccentric cam 107 makes contact with the ITB steering lever 115 varies with the rotation of the ITB steering eccentric cam 107. As a result, the ITB steering lever 115 is displaced in the direction of the arrow illustrated in FIG. 2 around a lever fulcrum shaft 301. The ITB steering level 115 is connected to the ITB steering roller 105. The position of the ITB steering roller 105 is thus adjusted according to the ITB steering lever 115 displaced by the rotation of the ITB steering eccentric cam 107.

To control a rotation angle of the ITB steering motor 108 according to the position of the ITB 101 detected by the belt position detection sensor 109, the drive control ASIC 111 transmits an instruction to the motor drive unit 113 based on control of the main control apparatus 200. This steers the position of the ITB 101. When the position of the ITB 101 deviates from a reference position, the position of the ITB 101 is thus corrected to the reference position.

Figure 3:
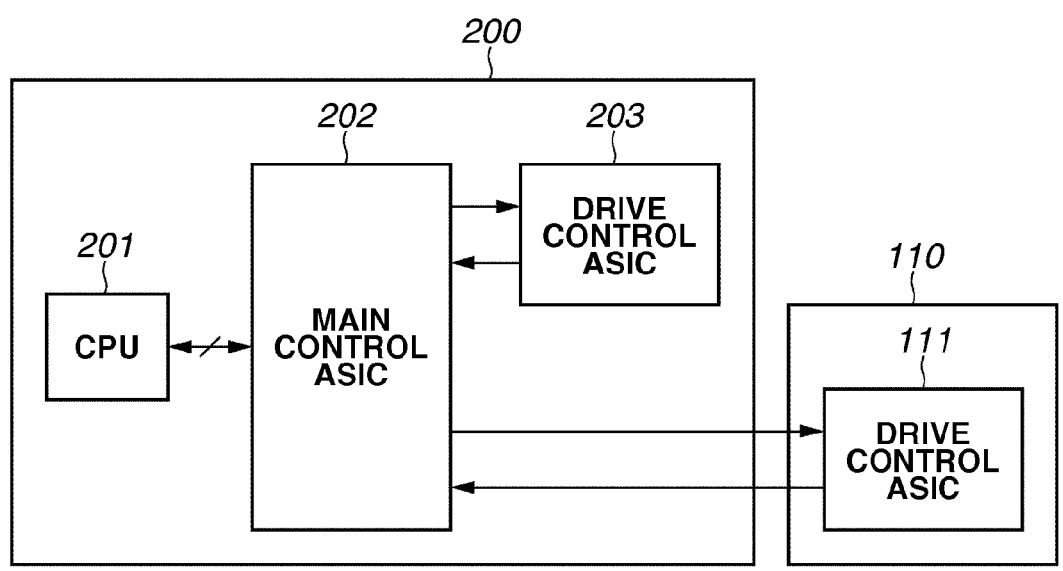
FIG. 3 is a block diagram of a main control apparatus.

FIG. 3 is a block diagram of the main control apparatus 200. While the present exemplary embodiment deals with serial communications between the main control apparatus 200 and the ITB drive control apparatus 110, the main control apparatus 200 performs similar serial communications with other devices that control driving parts, sensors, and other components in the image forming apparatus. Serial communications according to the present exemplary embodiment are also applicable to the serial communications with the other devices.

The main control apparatus 200 includes a CPU 201 and a main control ASIC 202. The main control apparatus 200 further includes a drive control ASIC 203 connected to the main control ASIC 202 by serial communication connection lines, and can control other components in the image processing apparatus. The main control ASIC 202 is connected to the drive control ASIC 111 of the ITB drive control apparatus 110 by serial communication lines. For the sake of convenience, the main control ASIC 202 will hereinafter be referred to as a "main station," and the drive control ASIC 111 as a "slave station."

Figure 4:
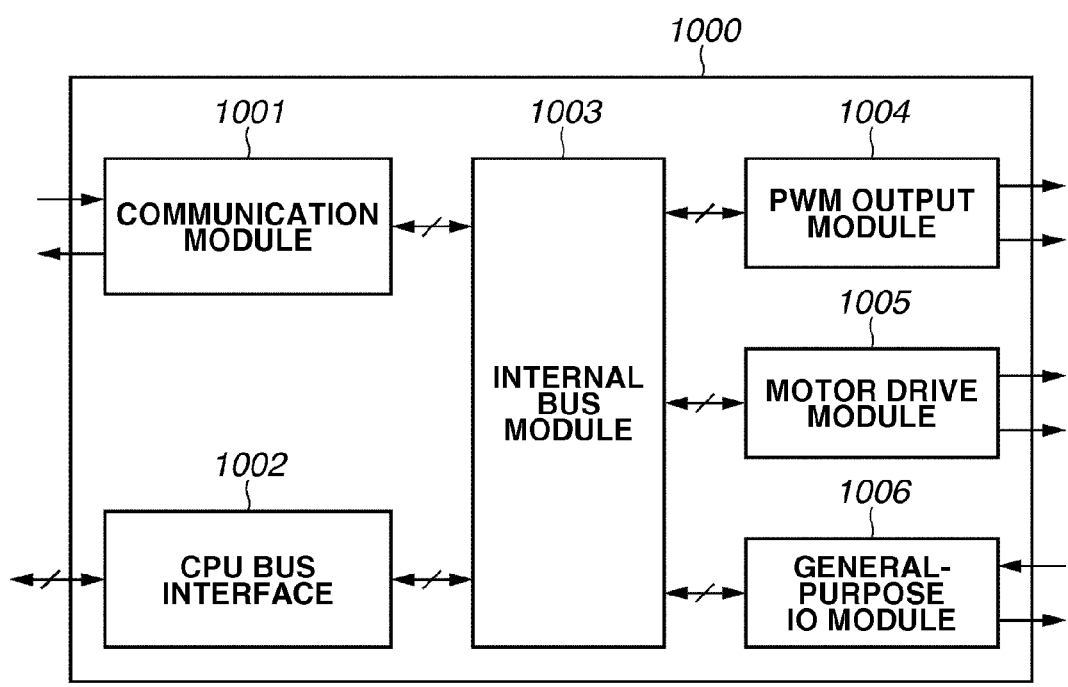
FIG. 4 is a block diagram of an ASIC.

FIG. 4 is a block diagram of an ASIC 1000 which is applicable to both the main station and the slave station. The ASIC 1000 operates as the main station or the slave station depending on inputs from not-illustrated external terminals for setting an operation mode. For example, the ASIC 1000 operates as the main station if (L,L) are input to two external terminals. The ASIC 1000 operates as the slave station if (H,H) are input to the two external terminals.

The ASIC 1000 includes a communication module 1001, a CPU bus interface 1002, an internal bus module 1003, a PWM output module 1004, a motor drive module 1005, and a general-purpose input/output (IO) module 1006.

The communication module 1001 performs an operation as the main station or an operation as the slave station, depending on the inputs from the external terminals. The CPU bus interface 1002 is activated only when the ASIC 1000 operates as the main station. The CPU bus interface 1002 is connected to the CPU 201 via a parallel bus.

The internal bus module 1003 is an internal bus of the ASIC 1000. The internal bus module 1003 is connected to the modules in the ASIC 1000. When the ASIC 1000 operates as the main station, the internal bus module 1003 accesses the modules based on an instruction from the CPU 201, received by the CPU bus interface 1002. When the ASIC 1000 operates as the slave station, the internal bus module 1003 accesses the modules based on an instruction from the main station.

The PWM output module 1004 and the motor drive module 1005 output pulse signals for driving and controlling not-illustrated electrical loads in the image forming apparatus, such as a brushless motor and a stepping motor. The general-purpose IO module 1006 includes an analog-to-digital (A/D) converter which detects an input state of a sensor signal of a photo-interrupter or performs A/D conversion on an analog signal.

Figure 5:
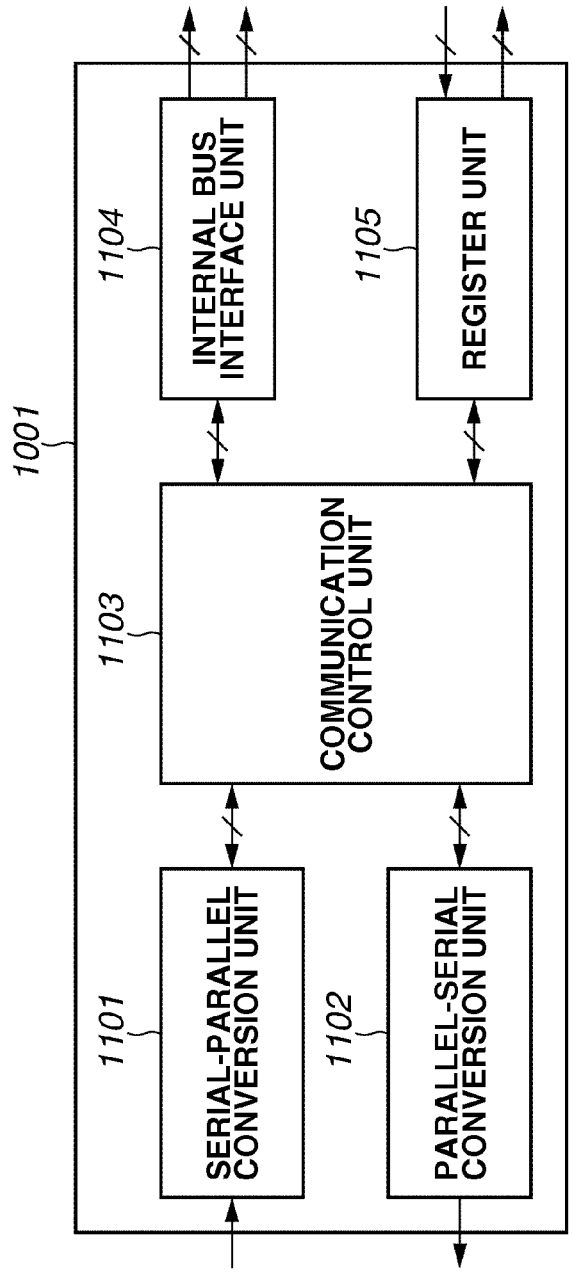
FIG. 5 is a diagram illustrating a specific configuration example of a communication module.

FIG. 5 is a diagram illustrating a specific configuration example of the communication module 1001. The communication module 1001 includes a serial-parallel conversion unit 1101, a parallel-serial conversion unit 1102, a communication control unit 1103, an internal bus interface unit 1104, and a register unit 1105. The serial-parallel conversion unit 1101 converts received serial data into parallel data. The parallel-serial conversion unit 1102 converts parallel data into serial data and transmits the serial data. The communication control unit 1103 performs communication control between the units in the communication module 1001. The internal bus interface unit 1104 is connected to the internal bus module 1003 in FIG. 4. The register unit 1105 stores setting values.

FIGS. 6 to 9 are explanatory diagrams illustrating communication protocols used for serial communication between the main station (main control ASIC 202) and the slave station (drive control ASIC 111). In FIGS. 6 to 9, serial data transmitted from the main station to the slave station is denoted by MOSI (Master Out Slave In). Serial data transmitted from the slave station to the main station is denoted by MISO (Master In Slave Out).

Figure 6:
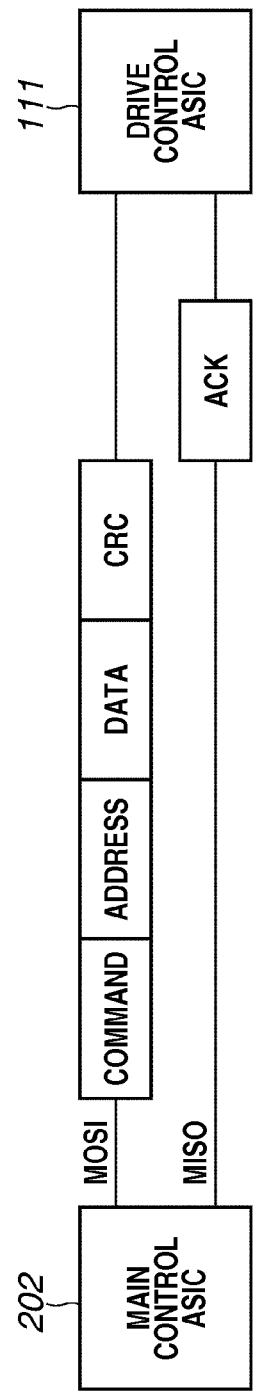
FIG. 6 is an explanatory diagram illustrating a communication protocol used for serial communication between a main station and a slave station.

FIG. 6 is a diagram illustrating a communication protocol when executing a write operation. The main station serially transmits pieces of frame data on a command, address, data, and CRC. The slave station receives the pieces of frame data in order. The slave station generates a CRC value from the received pieces of frame data on the command, address, and data, and compares the generated CRC value with the received CRC. If the comparison result indicates a match, the slave station transmits an acknowledgement (ACK: positive response) command to the main station. If the comparison result indicates a mismatch, the slave station transmits a negative acknowledgement (NACK: negative response) command to the main station.

For example, a CRC mismatch occurs when noise gets into data during transmission and a certain bit of the data is inverted.

The command transmitted from the main station specifies a write command or a read command. The command also specifies the number of pieces of data to be transferred. The specification of the number of pieces of data will be described below. CRC, or cyclic redundancy check, is a function for outputting a value of fixed size for an arbitrary length of data input. CRC is a kind of error correction code for detecting consecutive errors. CRC has a higher error detection accuracy than a parity checksum method, and is capable of faster calculation. Since CRC can be calculated by bit-by-bit scanning, CRC has the advantages of making a hardware configuration simple. CRC is thus widely used from networks to data transfer in hardware circuits.

In FIG. 6, if the main station receives the ACK command from the slave station, the main station determines that the communication has succeeded, and prepares for a next communication. If the main station receives the NACK command, the main station determines that the communication has failed, and retransmits the frame data. The main station repeats the retransmission until the slave station returns the ACK command. If there is no reply from the slave station, the main station waits for a predetermined time before retransmitting the frame data. If retransmission for a plurality of times has resulted in the return of the NACK command or no reply, the main station determines that no communication has been successfully established. The main station then provides a communication error display, and stops communication.

Figure 12:
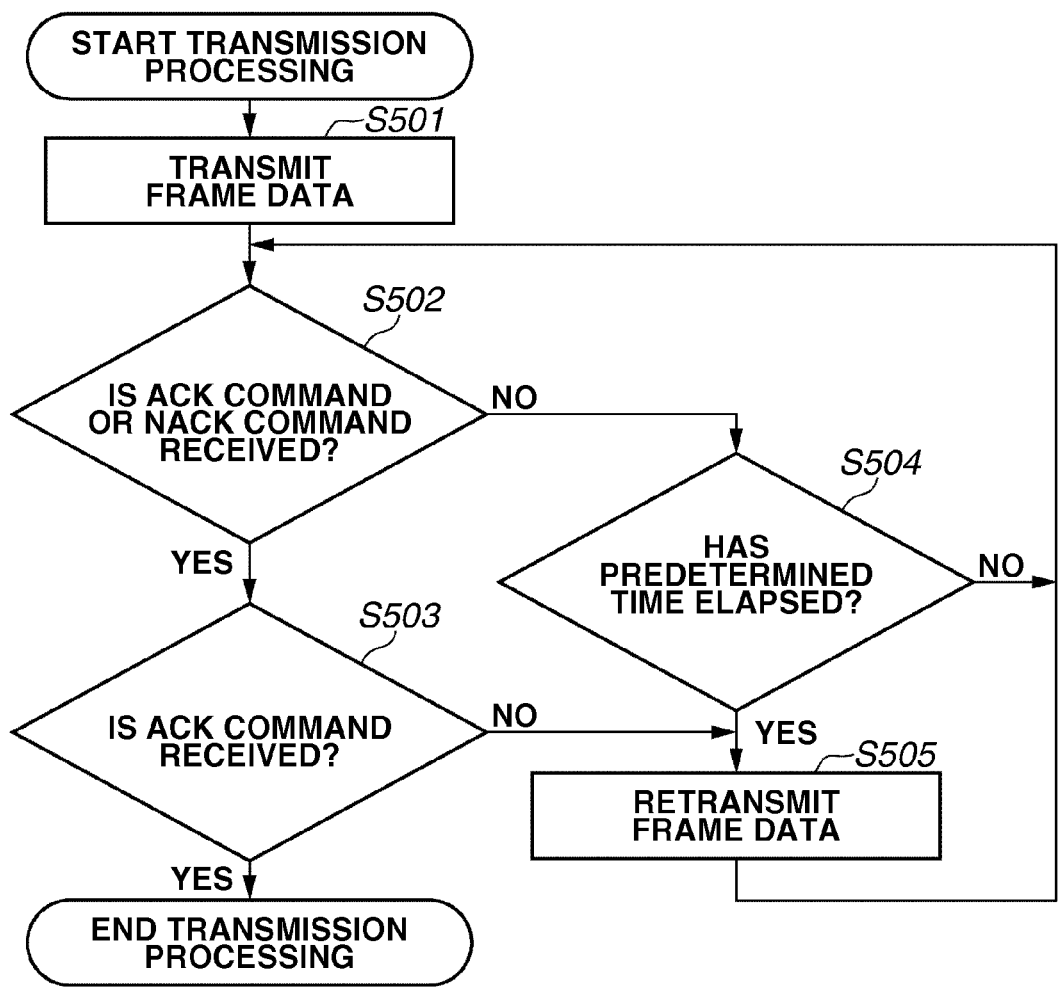
FIG. 12 is a flowchart illustrating processing of the main station during communication.

FIG. 12 is a flowchart illustrating processing of the main station during communication.

In step S501, the main station transmits frame data to the slave station. In step S502, the main station enters a standby state until the ACK command or the NACK command is transmitted from the slave station. If the main station receives the ACK command or the NACK command within a predetermined time (YES in step S502), the main station proceeds to step S503. In step S503, the main station checks whether the received command is the ACK command. If the received command is the ACK command (YES in step S503), the main station determines that the communication has succeeded, and ends the transmission processing.

If the main station receives neither the ACK command nor the NACK command even after a lapse of the predetermined time (NO in step S502 and YES in step S504), the main station proceeds to step S505. If the received command is the NACK command (NO in step S503), the main station also proceeds to step S505. In step S505, the main station determines that the communication has failed, and retransmits the frame data.

As described above, the main station retransmits the frame data if the main station does not receive either the ACK command or the NACK command, or receives the NACK command from the slave station, i.e., if the main station fails to properly receive the ACK command. Possible reasons why the main station fails to properly receive the ACK command include that the main station has actually failed to transmit the frame data to the slave station, and that noise gets into the reply data from the slave station to change the ACK command. The main station can thus retransmit the frame data also when noise gets into the reply data.

Figure 7:
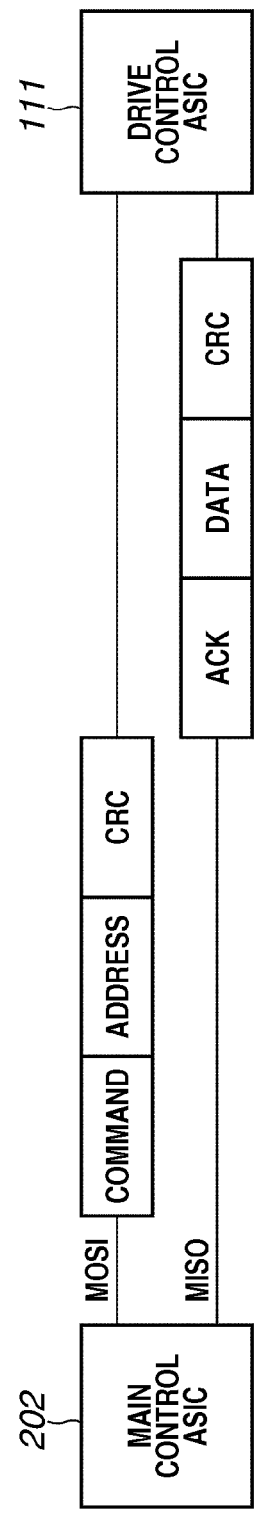
FIG. 7 is an explanatory diagram illustrating a communication protocol used for serial communication between the main station and the slave station.

FIG. 7 is a diagram illustrating a communication protocol when performing a read operation. The main station serially transmits pieces of frame data on a command, address, and CRC. The command specifies a read command. The slave station receives the pieces of frame data in order. The slave station generates a CRC value from the received pieces of frame data on the command and address, and compares the generated CRC value with the received CRC. If the comparison result indicates a match, the slave station transmits pieces of frame data on the ACK command, data corresponding to the received address, and CRC to the main station. The CRC for the slave station to transmit is calculated from the data to be transmitted. If the comparison result indicates a mismatch, the slave station transmits the NACK command to the main station like when performing a write operation. In such a case, the slave station will not transmit data or CRC.

If the main station receives the ACK command from the slave station, the main station determines that the communication has succeeded, and receives the data and CRC after the ACK command. The main station generates a CRC value from the data received from the slave station, and compares the generated CRC value with the received CRC to detect the presence or absence of an error in the data received from the slave station. If the comparison result indicates a match, the main station handles the data received from the slave station as reliable data. If the main station receives the NACK command or if the comparison result of the CRC indicates a mismatch, the main station retransmits the frame data as in the operation for performing a write operation.

Figure 8:
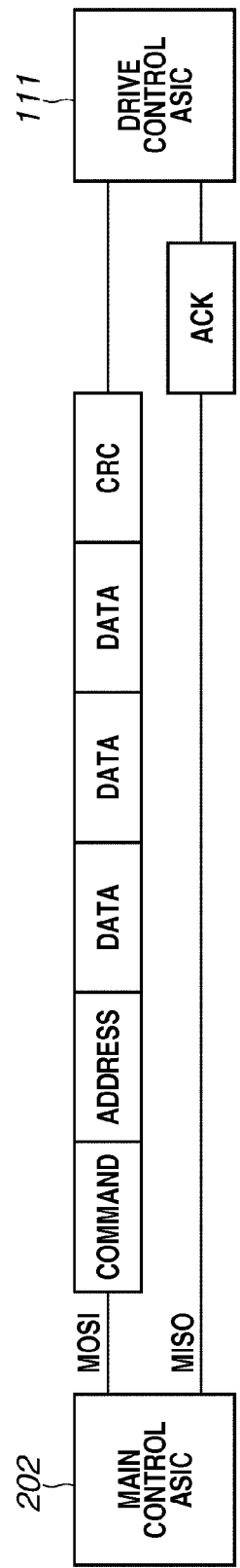
FIG. 8 is an explanatory diagram illustrating a communication protocol used for serial communication between the main station and the slave station.

FIG. 8 is a diagram illustrating a communication protocol when performing a burst (continuous) write operation. The command transmitted by the main station specifies a write command and the number of consecutive pieces of data to be written. The frame data on the address specifies a top address of the write operation. The frame data on the command is expressed, for example, by "1000_0001." The upper two bits indicate whether the command is a write command or a read command. For example, if the upper two bits are "10," the command is a write command. If the upper two bits are "01," the command is a read command. The lower six bits express the number of pieces of data. With a write command, the lower six bits express the number of pieces of data to be transferred. With a read command, the lower six bits express the number of pieces of data to be read. For example, lower six bits "00_1111" express that 15 pieces of data are to be transferred or read.

The slave station performs a CRC-based error detection like when performing an ordinary write operation in FIG. 6. The slave station transmits the ACK command or the NACK command to the main station according to the result of the error detection. Based on the received command, the main station determines whether the communication has succeeded or failed. If the communication has failed, the main station retransmits the frame data.

Figure 9:
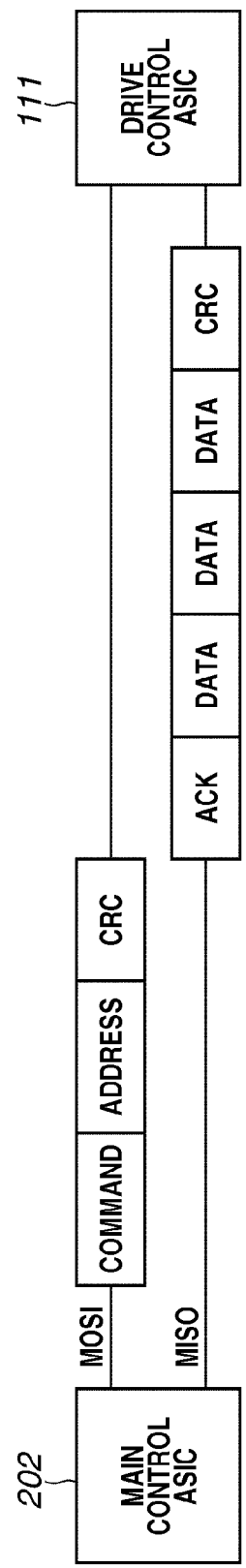
FIG. 9 is an explanatory diagram illustrating a communication protocol used for serial communication between the main station and the slave station.

FIG. 9 is a diagram illustrating a communication protocol when performing a burst (continuous) read operation. The command transmitted by the main station specifies a read command and the number of consecutive pieces of data to be read. The frame data on the address specifies a top address of the read operation. The frame data on the command is configured as described in conjunction with FIG. 8. According to the example in FIG. 8, the upper two bits are "01." The lower six bits specify the number of consecutive pieces of data to be read.

The slave station performs a CRC-based error detection like when performing an ordinary read operation in FIG. 7. The slave station transmits the ACK command or the NACK command to the main station according to the result of the error detection. Based on the received command, the main station determines whether the communication has succeeded or failed. If the communication has failed, the main station retransmits the frame data. If the communication has succeeded, the main station performs a CRC-based error detection on the received data. If the result of the error detection shows that the received data is erroneous, the main station retransmits the frame data.

Figure 10:
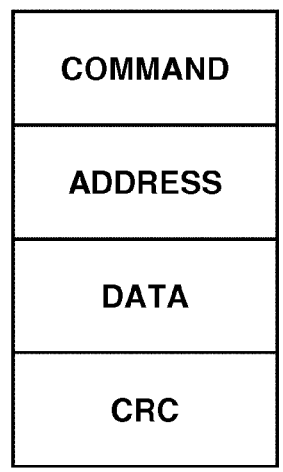
FIG. 10 is a diagram illustrating a configuration example of a temporary storage unit.

The communication module 1001 of the slave station includes a temporary storage unit (buffer) that temporarily stores pieces of frame data on the command, address, data, and/or CRC according to the communication protocols in FIGS. 6 to 8. The temporary storage unit stores such frame data until the slave station normally receives frame data by another communication. For example, when the slave station normally receives frame data, the slave station deletes the frame data received by the previous communication, which is stored in the temporary storage unit, and stores the frame data normally received by the current communication. FIG. 10 illustrates a configuration example of such a temporary storage unit. The temporary storage unit is configured as a part of the register unit 1105 of the communication module 1001.

As illustrated in FIG. 10, the temporary storage unit includes a storage unit for storing frame data on a command, a storage unit for storing frame data on an address, a storage unit for storing frame data on data, and a storage unit for storing frame data on CRC. When performing a read operation, all bits of the storage unit for storing the frame data on data can be filled with "0," whereas the frame data on the previous data may be left in the storage unit.

When performing a burst write operation, the last piece of data consecutively transmitted is stored in the storage unit for storing frame data on data. If all data transmitted during a burst write operation to be stored, the increased capacity of the storage unit will increase the circuit scale. Only the last piece of data is thus stored to minimize the circuit scale.

According to such communication protocols, the main station and the slave station perform serial communications to perform drive control on the motors and monitor the states of the sensors in the image forming apparatus.

According to the communication protocols in FIGS. 6 to 9, if a communication from the main station to the slave station has succeeded and noise gets into the corresponding ACK command from the slave station, the main station fails to properly recognize the ACK command and determines that the communication has failed. As a result, the main station retransmits the same frame data. The retransmission of the frame data may have a significant negative effect, for example, if the execution of a first write operation and the execution of a second write operation have different meanings. Examples include when the execution of a write operation to a register entails a state transition, like the execution of a write operation to an operation setting register of the motor drive module 1005.

The motor drive module 1005 outputs PWM signals intended for operation control to corresponding motor drive units according to initial speeds, target speeds, acceleration rates or deceleration rates, and current control values set in the operation setting register. When a write operation is performed to such an operation setting register twice in succession, a state transition from an operation wait state to an operation start state occurs twice in the motor drive module 1005. More specifically, when the first write operation to the operation setting register is performed, the motor drive module 1005 outputs a PWM signal so that the corresponding motor starts operation and accelerates or decelerates from an initial speed to a target speed. When the second write operation is performed, the motor drive module 1005 enters the operation start state again and outputs a PWM signal used to target the initial speed. As a result, the control performance of the motor is decreased so that a stable operation control cannot be achieved.

For example, in the case of the steering of the ITB 101, performing two consecutive write operations to the operation setting register of the motor drive module 1005 can reduce the steering effect or interfere with an intended operation, like fully steering the ITB 101 to one side.

Specifically, the position of the ITB 101 is steered when the position of the ITB 101 monitored by the belt position detection sensor 109 is displaced from a reference position. To adjust the position of the ITB steering roller 105 according to an instruction from the main control ASIC 202, the drive control ASIC 111 performs a first write operation to specify the rotation angle of the ITB steering motor 108. The execution of the write operation rotates the ITB steering eccentric cam 107 by a predetermined amount to perform ITB steering so that the ITB 101 returns to the reference position. If a second write operation is performed during the steering process, the ITB steering eccentric cam 107 is rotated by the predetermined amount again. This substantially sets a value twice the setting value for returning the ITB 101 to the reference position. As a result, the ITB 101 not only fails to be adjusted to the reference position but is rather deviated in position.

Figure 11:
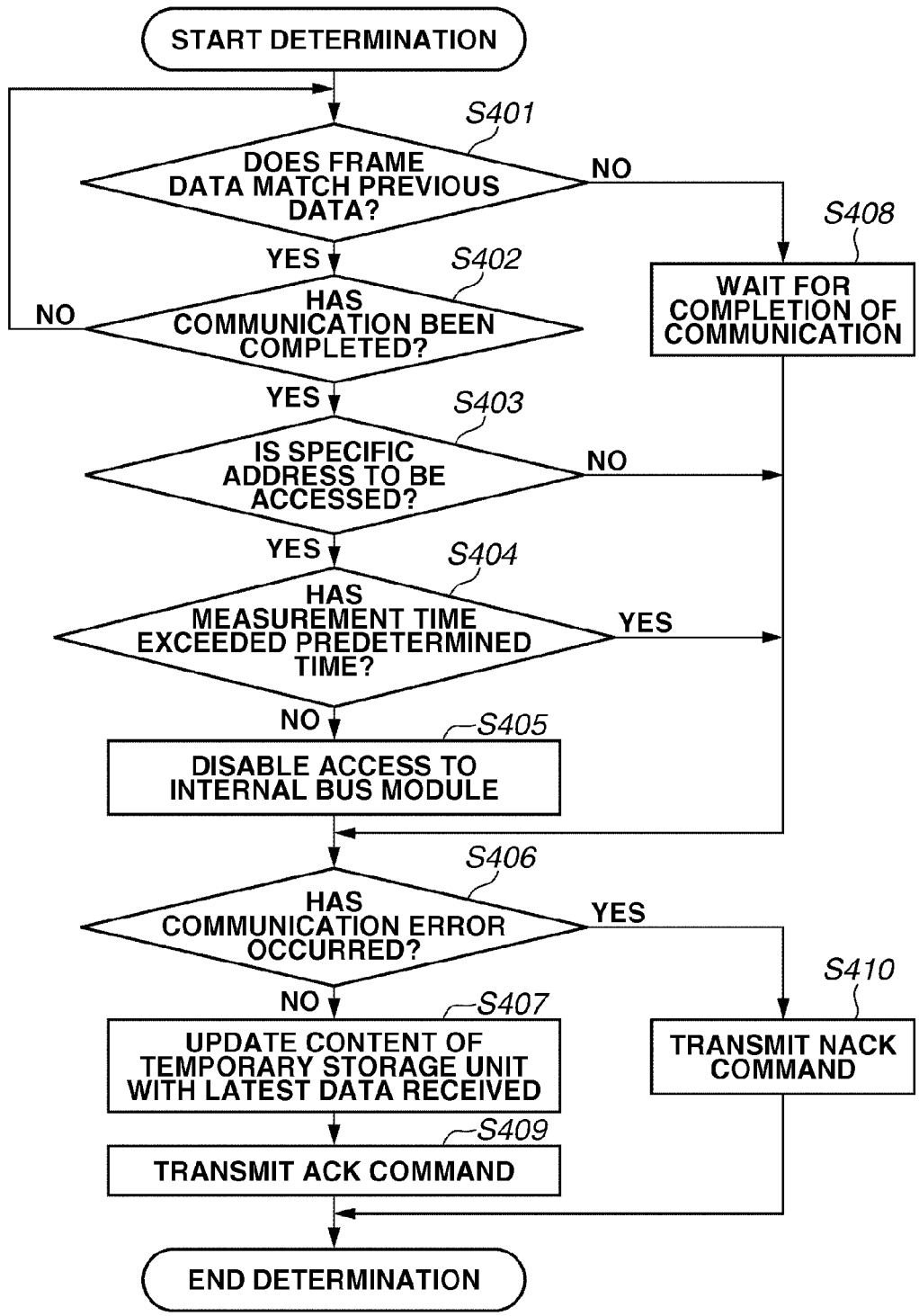
FIG. 11 is a flowchart illustrating a processing procedure for preventing a negative effect of execution of two consecutive write operations.

FIG. 11 is a flowchart illustrating a processing procedure for preventing such a negative effect of the execution of unintended two successive write operations. In FIG. 11, two consecutive accesses to a specific address are prevented to avoid a negative effect of the execution of two successive write operations. The processing in FIG. 11 is performed by the communication module 1001 of the slave station.

The main station transmits serial data such as illustrated in FIGS. 6 to 9 to the slave station. The communication module 1001 of the slave station successively converts the received serial data, i.e., the pieces of frame data on a command, address, data, and/or CRC into parallel data by using the serial-parallel conversion unit 1101. In step S401, the communication control unit 1103 compares the converted frame data with frame data transmitted by the previous communication, which is stored in the temporary storage unit in the register unit 1105.

If the comparison result indicates a mismatch (NO in step S401), the communication control unit 1103 proceeds to step S408. In step S408, the communication control unit 1103 waits for the completion of the communication. In such a case, neither a write execution of the same data to the same address nor a read execution from the same address occurs. Since no unintended access to the operation setting register occurs, the communication control unit 1103 need not disable access from the internal bus interface unit 1104 to the internal bus module 1003.

If the comparison result indicates a match (YES in step S401), the communication control unit 1103 proceeds to step S402 to repeat the processing of step S401 until the end of the communication based on the communication protocols illustrated in FIGS. 6 to 9. More specifically, in steps S401 and S402, the communication control unit 1103 determines whether the pieces of frame data on the command, address, data (only in a write operation), and CRC received according to the communication protocols in FIGS. 6 to 9 are exactly the same as the frame data received by the previous communication. Unintended two consecutive write or read operations will not occur unless a write operation of the same data to the same address or a read operation from the same address is performed. The communication control unit 1103 then proceeds to step S408. In the present exemplary embodiment, the communication control unit 1103 compares each of the command, address, data, and/or CRC with the corresponding data stored in the temporary storage unit each time the command, address, data, or CRC is received. Instead, the communication control unit 1103 may compare the received frame data with the frame data stored in the temporary storage unit after the completion of the communication.

If the entire frame data is the same as the frame data received by the previous communication (YES in step S402), the communication control unit 1103 proceeds to step S403. In step S403, the communication control unit 1103 determines whether the specified address indicating the access destination belongs to a specific address area. Examples of a specific address include addresses that individually specify addresses of the operation setting register in the motor drive module 1005, and an address that specifies a group of addresses of the operation setting register lying in a predetermined range. If such specific addresses are subjected to multiple write operations, the operation of the motor drive unit 113 becomes unstable. A register used to specify the specific addresses may be included in the register unit 1105. The communication control unit 1103 may independently include such a register.

If a specific address is to be accessed (YES in step S403), the communication control unit 1103 proceeds to step S404. In step S404, the communication control unit 1103 measures time from the time of completion of the previous communication to the time of completion of the current communication. The communication control unit 1103 then determines whether the measured time has exceeded a predetermined time. For example, if the measured time has exceeded the predetermined time, the retransmission of the frame data may not be due to the occurrence of a communication error but the frame data may have been transmitted to instruct the same processing as that of the previous communication (the same command, the same address, and the same data). If the predetermined time has elapsed (YES in step S404), the communication control unit 1103 therefore processes the same frame data as that of a valid communication.

If the time from the completion of the previous communication to the completion of the present communication is within the predetermined time (NO in step S404), the communication control unit 1103 proceeds to step S405. In step S405, the communication control unit 1103 disables access to the internal bus module 1003 by the internal bus interface unit 1104. In other words, the communication control unit 1103 disables access to the internal bus module 1003 if the entire frame data received within the predetermined time from the completion of the previous communication matches the data received by the previous communication and a specific address is to be accessed. The communication control unit 1103 gives an instruction to enable access to the internal bus module 1003, for example, by using an access permission flag. If the access permission flag is on and a communication has been normally completed, the access to the internal bus module 1003 is enabled. If either of the conditions is not satisfied, the access is disabled.

In step S406, having disabled the access to the internal bus module 1003, the communication control unit 1103 checks for a communication error by using CRC. The communication control unit 1103 also checks for a communication error if the communication has been completed in step S408, if no specific address is to be accessed in step S403 (NO in step S403), or if the measured time has exceeded the predetermined time in step S404 (YES in step S404).

If the check result shows that a communication error has occurred (YES in step S406), the communication control unit 1103 proceeds to step S410. In step S410, the communication control unit 1103 returns the NACK command to the main station. The communication control unit 1103 then ends the determination operation without updating the frame data of the temporary storage unit with the frame data received by the current communication. In such a case, no access to the internal bus interface 1003 occurs. If a communication error has occurred in this stage, the main station retransmits the frame data. If no communication error occurs during the retransmission, the resulting state becomes the same as with two consecutive accesses. To avoid this, the communication control unit 1103 does not update the content of the temporary storage unit.

If no communication error has occurred (the frame has been normally received; NO in step S406), the communication control unit 1103 proceeds to step S407. In step S407, the communication control unit 1103 updates the content of the temporary storage unit with the latest frame data received this time. In step S409, the communication control unit 1103 transmits the ACK command to the main station. Then, the processing instructed by the frame data is performed.

In such a manner, the communication module 1001 of the slave station prevents two consecutive accesses to a specific address.

As described above, if a communication from the main station to the slave station has succeeded but the main station fails to ascertain the success of the communication, the main station retransmits the frame data. In such a case, if a plurality of consecutive accesses occurs to the same address of the same operation setting register of the slave station, the slave station will not update the operation setting register. This can maintain communication quality of the serial communication without reducing the effect of the intended operation.

Aside from the prevention of two consecutive accesses to a specific address, the communication control unit 1103 may be configured to prevent a specific command (for example, a write command) from being performed twice in succession. In such a case, in step S403 of the flowchart in FIG. 11, the communication control unit 1103 may determine whether the command is the same as the previous one instead of determining whether a specific address is to be accessed. If the command is the same as the previous one (YES in step S403), the communication unit 1103 proceeds to step S404. In step S404, the communication control unit 1103 measures time from the time of completion of the previous communication to the time of completion of the current communication. The communication control unit 1103 then determines whether the measured time has exceeded a predetermined time. If the predetermined time has elapsed (YES in step S404), the communication control unit 1103 handles the specific command as that of a valid communication. If the time from the completion of the previous communication to the completion of the present communication is within the predetermined time (NO in step S404), the communication control unit 1103 proceeds to step S405. In step S405, the communication control unit 1103 disable access to the internal bus module 1003 by the internal bus interface unit 1104.

If the command is different from the previous one (NO in step S403), the communication control unit 1103 proceeds to step S406. In step S406, the communication control unit 1103 enters the processing for checking for a communication error by using CRC.

The communication control unit 1103 may shift from the processing in step S402 to the processing in step S404 without the determination of a specific address.

As described above, a control apparatus according to the present exemplary embodiment disables a write operation of current data to a storage unit if the content of previous data matches that of the current data and if the access destination of the current data is in an area where multiple write operations of data can cause an unstable operation of a controlled apparatus. For example, suppose that a communication from a main station to a slave station has succeeded and a reply from the slave station to the main station causes a communication error, followed by data retransmission. Even in such a case, a plurality of consecutive write operations to the same address of the storage unit of the slave station can be prevented. This allows stable operation control of the controlled apparatus without interfering with operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161268 filed Jul. 20, 2012, which is hereby incorporated by reference herein in its entirety.

What is claimed is:

1. A control apparatus configured to receive instruction data from a transmission unit and to control a controlled apparatus based on the instruction data, the control apparatus comprising:
    a determination unit configured to determine an error in reception of the instruction data from the transmission unit;
    a communication unit configured to receive the instruction data from the transmission unit and to transmit reply data according to a result of determination of the determination unit to the transmission unit;
    a module configured to control the controlled apparatus based on the instruction data; and
    a control unit configured to, if a content of current instruction data received by the communication unit matches a content of previous instruction data received by the communication unit, control the module not to control the controlled apparatus based on the current instruction data.

2. The control apparatus according to claim 1, wherein the control unit is configured to, if the current instruction data includes a specific instruction, control the module to control the controlled apparatus based on the current instruction data even when the current instruction data is the same as the previous instruction data.

3. The control apparatus according to claim 1, wherein the control unit is configured to, if a time from timing when the previous instruction data is received to timing when the current instruction data is received exceeds a predetermined time, control the module to control the controlled apparatus based on the current instruction data even when the current instruction data is the same as the previous instruction data.

4. The control apparatus according to claim 1, further comprising a storage unit configured to store the instruction data received by the communication unit,
    wherein the control unit is configured to compare the current instruction data with the previous instruction data stored in the storage unit.

5. The control apparatus according to claim 1, wherein the determination unit is configured to analyze the instruction data and to determine the error based on a result of the analysis.

6. The control apparatus according to claim 1, wherein the communication unit is configured to perform serial communication with the transmission unit.

7. The control apparatus according to claim 2, wherein the instruction data includes a command, an address, and data, and
    wherein the control unit determines whether the current instruction data includes the specific instruction based on the address.

8. A control apparatus configured to receive instruction data from a transmission unit and to control a controlled apparatus based on the instruction data, the control apparatus comprising:
    a register configured to store data for controlling an operation of the controlled apparatus;
    a determination unit configured to determine an error in reception of the instruction data from the transmission unit;
    a communication unit configured to receive instruction data from the transmission unit and to transmit reply data according to a result of determination of the determination unit to the transmission unit, the instruction data including an address of the register to be written and data;

a storage unit configured to store the instruction data received by the communication unit; and a control unit configured to, if a content of current instruction data received by the communication unit does not match a content of previous instruction data stored in the storage unit, perform control to write the data included in the current instruction data to the address of the register included in the current instruction data, and if the content of the current instruction data received by the communication unit matches the content of the previous instruction data stored in the storage unit, to perform control not to write the data included in the current instruction data to the address of the register included in the current instruction data.

9. The control apparatus according to claim 8, wherein the control unit is configured to, if the address of the current instruction data is not a specific address, perform control to write the data included in the current instruction data to the address of the register included in the current instruction data even when the current instruction data is the same as the previous instruction data.

10. The control apparatus according to claim 8, wherein the control unit is configured to, if a time from timing when the previous instruction data is received to timing when the current instruction data is received exceeds a predetermined time, perform control to write the data included in the current instruction data to the address of the register included in the current instruction data.

\* \* \* \* \*